United States Patent [19]

Cusumano

[11] 3,844,981
[45] Oct. 29, 1974

[54] METHOD FOR PREPARATION OF OLEFIN OXIDATION CATALYST

[75] Inventor: James A. Cusumano, Rahway, N.J.

[73] Assignee: Exxon Research & Engineering Co., Linden, N.J.

[22] Filed: June 5, 1972

[21] Appl. No.: 259,929

Related U.S. Application Data

[63] Continuation-in-part of Ser. No. 887,747, Dec. 23, 1969, abandoned.

[52] U.S. Cl................ 252/471, 252/474, 252/476, 260/348.5 R
[51] Int. Cl........................ B01j 11/08, B01j 11/22
[58] Field of Search.................... 252/476, 471, 474; 260/348.5 R

[56] References Cited
UNITED STATES PATENTS

| | | | |
|---|---|---|---|
| 2,143,371 | 1/1939 | Francon........................... | 260/348.5 |
| 2,424,083 | 7/1947 | Finch et al....................... | 252/476 X |
| 2,605,239 | 7/1952 | Sears................................. | 252/475 |
| 3,144,416 | 8/1964 | Hosoda et al.................... | 252/476 |
| 3,664,970 | 5/1972 | DeMaio........................... | 252/476 X |

FOREIGN PATENTS OR APPLICATIONS

| | | | |
|---|---|---|---|
| 717,201 | 2/1942 | Germany..................... | 260/348.5 R |
| 1,068,684 | 11/1959 | Germany..................... | 260/348.5 R |
| 1,048,898 | 1/1959 | Germany..................... | 260/348.5 R |

*Primary Examiner*—Daniel E. Wyman
*Assistant Examiner*—W. J. Shine
*Attorney, Agent, or Firm*—R. J. Baran

[57] ABSTRACT

A method for preparing an olefin oxidation catalyst, which comprises impregnating silver oxide or a water-insoluble silver salt, e.g. silver carbonate, silver carboxylates (having from 1 to 10 carbon atoms), silver chloride, etc., having a surface area of from 20 to 40 m²/g, preferably from 25 to 35 m²/g, with a solution containing a decomposable salt, selected from the group consisting of salts of Groups VII-B, I-B, or the iron group of Group VIII of the Periodic Table of the Elements, drying said impregnated salt, and activating by contacting with a reducing environment. Preferably the silver compound is silver oxide and said decomposable salt is selected from the group consisting of gold, copper, rhenium, manganese, and iron salts. The catalysts prepared by the instant method are especially effective in the oxidation of ethylene to ethylene oxide.

14 Claims, No Drawings

METHOD FOR PREPARATION OF OLEFIN OXIDATION CATALYST

CROSS REFERENCE TO RELATED APPLICATIONS

The instant application is a C.I.P. of U.S. application Ser. No. 887,747, filed on Dec. 23, 1969 now abandoned, in the name of James A. Cusumano.

BACKGROUND OF THE INVENTION

1. Field of the Invention

The instant invention relates to a method for the preparation of an olefin oxidation catalyst which comprises impregnating silver oxide or a water insoluble silver salt having a surface area of from 20 to 40 $m^2/g$, preferably from 25 to 35 $m^2/g$, with a solution containing a decomposable salt selected from the group consisting of salts of Groups VII–B, I–B, or the iron subgroup of Group VIII of the Periodic Table of the Elements, drying said impregnated oxide or salt, and activating by contacting said dried impregnated oxide or salt with a reducing environment. The catalysts prepared by the instant method are useful in oxidizing $C_1$ to $C_{10}$ alpha olefins to their corresponding epoxides. Preferably the alpha olefin is selected from the group consisting of 1-butene, propylene and ethylene, and most preferably the olefin is ethylene.

The water-insoluble silver salt is preferably selected from the group consisting of silver carbonate, silver halides, especially silver chloride, and silver carboxylates having from 1 to 10 carbon atoms, i.e., silver formate, silver lactate, silver propionate.

The preferred decomposable salt is selected from the group consisting of gold, copper, rhenium, manganese, and iron salts, especially the chloride and nitrate derivatives thereof.

2. Description of the Prior Art

Ethylene oxidation catalysts comprising silver promoted with various other metals have been taught in the prior art. For example, U.S. Pat. No. 2,605,239 teaches a silver BeO catalyst which is prepared by a coprecipitation technique.

U.S. Pat. No. 3,144,416 teaches a silver catalyst for use in an ethylene oxide process wherein catalytic silver powder is dispersed in electrolytic silver and molded. Promoters which are useful in forming the catalyst described in this patent include copper, gold, or the oxides thereof.

U.S. Pat. No. 2,143,371 teaches a method for preparing a silver catalyst for ethylene oxidation, which comprises mechanically converting bulk silver, which may be alloyed with gold, copper or iron, into catalytically active flakes. The catalysts produced by this method would have the promoter metal uniformly distributed throughout the catalyst.

German Pat. No. 717,201 teaches that a silver ethylene oxidation catalyst may be prepared by the reaction of silver nitrate, copper nitrate and gold chloride with hydrazine. This catalyst preparation technique relies on a coprecipitation of all three of the metals from solution, thus, once again, providing a catalyst which is substantially homogeneous with regard to metal promoter concentration throughout the catalyst.

German Pat. No. 1,048,898 teaches preparation of a silver catalyst for ethylene oxide production wherein said silver is in combination with an alkaline earth oxide and a heavy metal promoter. This catalyst preparation technique calls for the coprecipitation of the silver and the heavy metal by use of the alkaline earth material and the deposition of the wet precipitated mass on an inert carrier. This catalyst preparation technique also relies, on coprecipitation and further since an inert carrier is utilized, to support the catalyst, it would be expected that insufficient heat dissipation during use, would be obtained, unlike catalyst of the instant invention wherein silver metal provides the bulk of the catalyst.

German Pat. No. 1,068,684 teaches that a silver catalyst for ethylene oxide production may be prepared by treating a silver nitrate solution containing a few % alkaline earth nitrate with ammonium oxalate and thermally decomposing the resulting silver oxalate, followed by washing, drying and grinding. Once again, this reference teaches the incorporation of promoters, such as small amounts of gold, copper and iron, or peroxides, oxides or hydroxides of barium, strontium or lithium. The catalyst preparation technique disclosed relies on precipitation of a soluble silver salt.

None of these techniques provide the advantage of the instant invention in that by utilization of the specific method for the preparation of catalysts disclosed herein below, a catalyst wherein the promoter metals are in substantially high concentration at the surface wherein the catalytic effect is obtained and the bulk portion of the catalyst particle is substantially pure silver metal. This allows the economical utilization of specific promoters which are sufficiently more expensive than silver while obtaining results equal to or better than the prior art promoted silver catalysts. For example, gold or rhenium will be in substantial concentration at the catalytic surface thus allowing much decreased amounts of promoter to be utilized without substantial loss of catalytic effect. Provision of substantially pure silver in the interior of the catalyst particle provides more effective heat dissipation than is the case with a catalyst having promoter metals distributed evenly throughout. Further, none of the instant references appear to teach that silver oxide or a water insoluble silver salt having surface area of between 20 and 40 $m^2/g$ must be utilized in forming the silver catalyst of the instant invention. It has been found that silver salts with surface areas of less than 20 $m^2/g$ form catalysts which require high temperatures to achieve reasonable conversions, thus causing decreased selectivity especially in ethylene oxide processes. Silver salts having surface areas of greater than 40 $m^2/gm$ provide catalysts which yield excellent conversions but low selectivity to the desired epoxide product. Finally, the processes taught in the prior art for preparing olefin ethylene oxidation catalysts do not take advantage of the impregnation technique described below wherein substantially all of the solution of the decomposable salt is impregnated into the pores of silver oxide or the water insoluble silver salt. This technique provides for increased contacting of the promoter metal with the silver metal at the surface and the avoidance of agglomeration of separate promoter metal particles upon activation.

SUMMARY OF THE INVENTION

According to this invention it has unexpectedly been found that a multimetallic catalyst useful for the oxidation of $C_1$ to $C_{10}$ alpha olefins to the corresponding 1,2 epoxides, comprising minor amounts of one or more metals selected from Group VII-B, I-B or the iron group of the Group VIII metals and a major amount of silver may be prepared by a unique technique in which silver oxide or a water insoluble silver salt such as the carbonate, formate or lactate, preferably the oxide, which has a surface area of from 20 to 40 m$^2$/g, preferably 25 to 35 m$^2$/g, is impregnated with a decomposable salt of the designated metals. The salts which may be used include soluble nitrates or chlorides of the metals in Group VII-B, I-B or the iron group of Group VIII of the Periodic Table. The surface area limitations described above are critical in that lower surface areas give insufficient catalyst activity in the finished catalyst while higher surface areas give inferior selectivity to the desired epoxide products.

Impregnation takes place as follows: silver oxide powder is comingled with an aqueous solution of the designated metal salts, e.g. copper nitrate, auric chloride, or rhenium trichloride. A minimum amount of water is used and the resulting impregnated product is merely damp. The impregnated silver oxide is dried, reduced, preferably in a hydrogen atmosphere, and preferably is then washed. The drying and reduction may be carried out simultaneously, but preferably serially. Of course, the metal salts may be dissolved in any solvent wherein they are sufficiently soluble. For convenience, aqueous impregnating solutions are used.

Drying may be readily effected by prolonged exposure to warm air. Temperature of the air may vary from 50° to 100°C., the drying period may last from 16-24 hours.

The reducing step serves to bring both silver oxide or the silver salt and the impregnating salt down to their respective metallic states, and this is necessary to activate the instant catalyst; it appears that reducing causes an alloy to form. There is, however, no intent to be bound by any theory. The resulting catalyst is powdered in texture, but may be pelletized as desired.

Typically, the reduction will take place in a hydrogen environment. The reduction is affected at a temperature of 150° to 300°C. by passing hydrogen over the impregnated silver salt at a rate of 5 to 25 liters/hr/gram of catalyst. Other reducing agents may be utilized but hydrogen is preferred.

Washing takes place in a basic environment, preferably ammonium hydroxide. Several wash stages in which 50 percent ammonium hydroxide and distilled water are alternated may be used; typically there are 5 to 10 wash stages.

The catalyst may contain 0.2 to 10 wt. percent of the metal selected from Group I-B, VII-B or the iron subgroup of Group VIII and about 90 to 99.8 wt. percent silver, preferably about 0.5 to 5 wt. percent of the I-B, VII-B or iron Group VIII metal and about 95 to 99.5 wt. percent of silver and most preferably 0.5 to 2 wt. % of the I-B, VII-B or iron Group VIII metal and about 98 to 99.5 wt. percent silver.

The preferred catalysts prepared by this method are bimetallic, i.e. silver-gold, silver-copper and silver-rhenium. The bimetallic catalyst of the instant invention may be promoted and stabilized in a manner similar to that with which the silver catalyst have been promoted and stabilized in the past. All of the catalyst may be stabilized against long-term deactivation by mixing 5-10 percent by wt. of barium peroxide with the silver oxide before it is impregnated with the other metal salt. Thus, for example one could wet a mixture of 8 g barium peroxide +92 g silver oxide with just enough water to make a homogeneous paste. This paste is then dried over a steam bath with constant agitation. Then one can impregnate this material with the appropriate metal salt solution and follow through with the above-described procedures.

Standard promotion of the bimetallic catalysts is accomplished by keeping a constant concentration of ethylene dichloride in the feed stock. This concentration may range anywhere from 1 to 1000 parts per million but the 5 to 100 range is preferably and the 5 to 20 range is most preferable. With this technique bimetallic catalysts are promoted from the 70 percent selectivity level to about the 80 percent level at similar conversion levels.

The catalyst produced by the instant invention, whether promoted or not, may be utilized to oxidize olefins. Preferably $C_1$ to $C_{10}$ alpha olefins are converted to their corresponding 1,2 epoxides by use of these catalysts. The preferred alpha olefin reactants are selected from the group consisting of 1-butene, propylene and ethylene. The catalysts prepared by the instant methods are especially preferred for the oxidation of ethylene to ethylene oxide. Conditions for promoted and non-promoted ethylene oxidation reactions are essentially the same.

The reaction mixture comprises about 20-40 wt. percent oxygen, about 5-20 wt. percent ethylene and the remainder about 40-75 wt. percent of an inert gas such as nitrogen or helium. The inert gas serves to reduce the explosive limits of the mixture. A mixture of ethylene and air may also be utilized since this would supply both the oxygen and the nitrogen. The reactants are contacted with the catalyst at a temperature of 150° to 350°C., preferably 175° to 300°C. and most preferably 200° to 300°C. Pressures which may be utilized may range from 1 to 5 atm., preferably 1 to 2 atm. and most preferably about 1 atm. The reactants are passed over the catalyst at a space velocity of 1000 to 4000, preferably 1500 to 2500 and most preferably 1800 to 2200 V/V/hr. Utilizing the catalyst of the instant invention, the typical product breakdown recovered from the reaction is as follows: About 60 to 75 mole percent $C_2H_4O$ the rest being $CO_2$ + $H_2O$.

The catalyst is utilized in the form of 20-40 mesh catalyst particle size. The catalyst can also be conveniently diluted with low surface area diluents such as silica, alumina or carborundum. The type of reactor utilized is not critical but it is preferred to use a fixed bed reactor heated in a fluidized sand or molten salt bath.

SPECIFIC EMBODIMENTS

Example 1

In this example, ethylene and oxygen were reacted to form ethylene oxide using a variety of catalysts. All runs were made at 1 atmosphere. The ethylene was oxidized in the presence of helium and the mole ratio of ethylene to oxygen to helium was 1:5:10. In all instances, 8.6 grams of catalyst were diluted to 10 cc with silica beads. The combined feedstream of ethylene, oxygen, and helium was passed over the catalyst at a rate of 1800 V/V/hr. The reactor utilized was a glass U-tube reactor 15 mm I.D. fixed in a fluidized sand bath.

The catalysts comprised the following bimetallic catalyst: silver and 0.5 wt. percent rhenium, silver and 0.5 percent copper and silver and 0.5 percent gold. The catalysts were prepared by impregnating a high surface area silver oxide, which had a surface area of about 30 m²/g, with aqueous solutions of salts of the above-mentioned metals, followed by drying at 60° to 70°C. (for 16 hrs. in air).

The silver-gold catalyst was prepared from a solution of $HAuCl_4$, the silver-rhenium catalyst was prepared from a solution of rhenium chloride and the silver-copper catalyst was prepared from a solution of copper nitrate.

The dried catalysts were then carefully reduced in 10 percent hydrogen in a helium gas stream at 200°C. for about 4 hours. This served to activate the catalyst. Catalysts were then washed by the following technique for each batch of 20 grams of catalysts: Initially the catalyst was slurried with 500 cc's of distilled water, decanted and slurried again for 1 hour with 400 cc's of 50 percent ammonium hydroxide. The catalyst was then filtered and washed with 1 liter of distilled water, slurried for 1 hour with 400 cc's of 50 percent ammonium hydroxide in water and rinsed with 500 cc's of distilled water. The procedure was repeated 5 times and finally the mixture was filtered and dried over night at 110°C.

All impregnations were done using a well-dried sample of $Ag_2O$ plus a sufficient amount of the pertinent salt to give the necessary bimetallic composition. In every case only 0.23 cc of water was used per gram of $Ag_2O$. Thus for example to make an 0.5 wt. percent Au in Ag catalyst one would dissolve 0.15 g of $HAuCl_4 \cdot 3H_2O$ in 3.75 cc $H_2O$ and impregnate 16.1 g of $Ag_2O$ with this solution. It is then dried at 60°C. over night and finally reduced as described above in a 10 percent $H_2$ in He mixture.

The catalysts were then utilized in the oxidation of ethylene to ethylene oxide, with the results indicated in the following table.

TABLE

EFFECT OF GROUP IB AND GROUP VIIB METALS ON THE SELECTIVITY OF SILVER FOR ETHYLENE OXIDATION TO ETHYLENE OXIDE

| Reaction Catalyst | $2C_2H_4 + O_2 \rightarrow 2C_2H_4O$ | | T°C of Reaction |
|---|---|---|---|
| | Conversion | % Selectivity (To $C_2H_4O$)[b] | |
| Ag | 60 | 49 | 212 |
| Ag, 0.5% Au | 60 | 70 | 255 |
| Ag, 0.5% Re | 60 | 70 | 250 |
| Ag, 0.5% Cu | 60 | 60 | 280 |

[a] Percent conversion = moles $C_2H_4$ reacted/moles $C_2H_4$ Fed
[b] Percent selectivity ($C_2H_4O$) = moles $C_2H_4$ converted to $C_2H_4O$/moles $C_2H_4$ converted Percent selectivity and percent conversion were determined by gas chromatographic analysis.

From the above results we see that the silver had the lowest selectivity to ethylene oxide, only about 49 percent. The silver-gold and silver-rhenium were the best with about 70 percent selectivity to ethylene oxide. Silver-copper was also significantly superior to silver with a selectivity of about 60 percent.

Example 2

In this Example the exact conditions for ethylene oxidation as in Example 1 are utilized except that the catalyst comprises silver and manganese.

One prepares the 0.5 Mn–99.5 Ag Manganese-Silver catalyst by dissolving 0.62 g of a 50 percent Manganese nitrate solution of which 15.4 percent is manganese in water. The final volume is 4.1 cc. Then one impregnates 20.4 grams of $Ag_2O$. Dry at 60°C. and reduce and wash as indicated in Example 1.

Utilizing the exact conditions for the silver-gold catalyst in Example 1, about 70 percent selectivity is observed over the same conversion range.

Example 3

In this Example the exact conditions of Example 2 are utilized except that the catalyst comprises silver and iron. One prepares the 0.5 Fe–99.5 Ag iron-silver catalyst by dissolving 0.689 g of ferric nitrate of which 13.8 percent is Fe in water to make a 4.1 cc volume. Then one impregnates 20.4 grams of $Ag_2O$. The catalyst is then dried at 60°C. and reduced and washed as indicated above in Example 1. The conversion of ethylene to ethylene oxide is accomplished at 70 percent selectivity; again, the selectivity is determined as in Example 1 and the conversion range is similar.

Example 4

Utilizing the exact conditions of Example 2, except for the catalyst which is silver-ruthenium, ethylene is again converted to ethylene oxide. One prepares the 0.5 Ru–99 Ag ruthenium-silver catalyst by dissolving 0.266 grams into $RuCl_3 \cdot nH_2O$ (38.6 percent Ru) into water to make 4.05 cc volume. Then impregnate 20.41 grams $Ag_2O$. The catalyst is then dried at 60°C. and reduced and washed as indicated in Example 1. About 70 percent selectivity to ethylene oxide is observed as determined in Example 1.

What is claimed is:

1. A method for preparing a multimetallic olefin oxidation catalyst which comprises contacting silver oxide or a water-insoluble silver salt, selected from the group consisting of silver carbonate, silver formate or silver lactate, having a surface area of from 20 to 40 m²/gm with an aqueous solution of one or more soluble salts of metals selected from the group consisting of copper, gold, iron, rhenium, manganese and ruthenium, whereby silver oxide or said silver salt is impregnated with said solution, drying said impregnated silver oxide or said silver salt, reducing said dried impregnated silver oxide or silver salt to bring said silver oxide or said silver salt and said impregnating salt down to their respective metallic states, and recovering an active multimetallic catalyst.

2. The process of claim 1 wherein said catalyst is prepared from silver oxide.

3. The process of claim 1 wherein said reduction takes place in a hydrogen atmosphere.

4. The process of claim 1 wherein said soluble salt is a gold salt.

5. The process of claim 1 wherein said soluble salt is a copper salt.

6. The process of claim 1 wherein said soluble salt is a rhenium salt.

7. The process of claim 1 wherein said reduced impregnated silver salt or silver oxide is washed prior to recovery.

8. The process of claim 7 wherein said reduced impregnated salt or oxide is washed with ammonium hydroxide.

9. A method for preparing a bimetallic catalyst for the conversion of ethylene to ethylene oxide which comprises impregnating silver oxide, having a surface area of from 20 to 40 m²/gm, with a solution of decomposable metal salt, selected from the group consisting of salts of metals selected from the group consisting of copper, gold, iron, rhenium, manganese, and ruthenium, drying said impregnated silver oxide, and activating said dried impregnated silver oxide by reducing both said dried impregnated silver oxide and said impregnating salt down to their respective metallic states.

10. The process of claim 9 wherein said soluble salt is a gold salt.

11. The process of claim 9 wherein said soluble salt is a copper salt.

12. The process of claim 9 wherein said reduced impregnated silver oxide is washed prior to recovery.

13. The process of claim 9 wherein said dried impregnated silver oxide is washed with ammonium hydroxide.

14. The product of claim 13.

* * * * *